Feb. 17, 1953 H. S. GIPE 2,628,577
PRETZEL TWISTING MACHINE
Filed March 18, 1947 17 Sheets-Sheet 1

INVENTOR.
HARRISON S. GIPE
BY Joshua H. Potts
HIS ATTORNEY

Feb. 17, 1953  H. S. GIPE  2,628,577
PRETZEL TWISTING MACHINE
Filed March 18, 1947  17 Sheets-Sheet 3

INVENTOR.
HARRISON S. GIPE
BY Joshua H. Potts
HIS ATTORNEY

Feb. 17, 1953 H. S. GIPE 2,628,577
PRETZEL TWISTING MACHINE
Filed March 18, 1947 17 Sheets-Sheet 4

INVENTOR.
HARRISON S. GIPE
BY Joshua R. H. Potts
HIS ATTORNEY

Feb. 17, 1953 H. S. GIPE 2,628,577
PRETZEL TWISTING MACHINE
Filed March 18, 1947 17 Sheets-Sheet 5
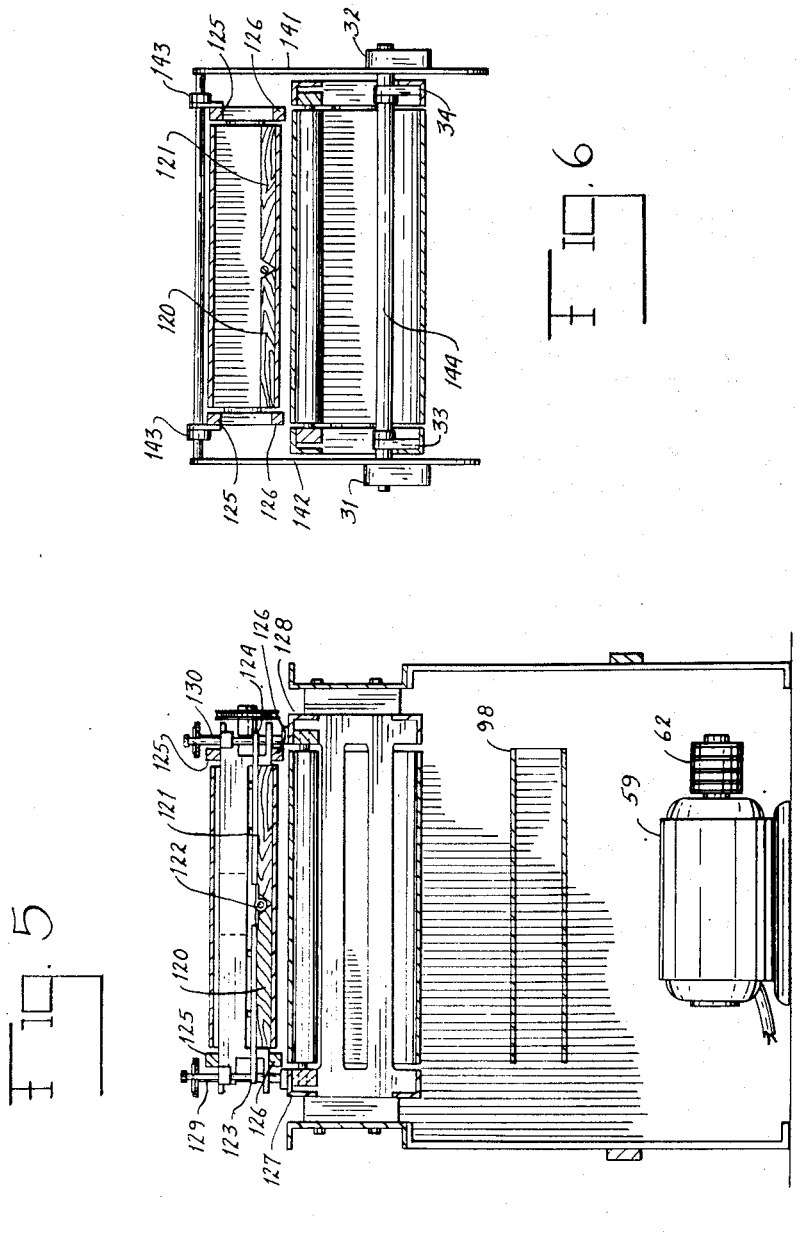
INVENTOR.
HARRISON S. GIPE
BY Joshua R H Potts
HIS ATTORNEY Feb. 17, 1953          H. S. GIPE          2,628,577
PRETZEL TWISTING MACHINE
Filed March 18, 1947          17 Sheets-Sheet 6
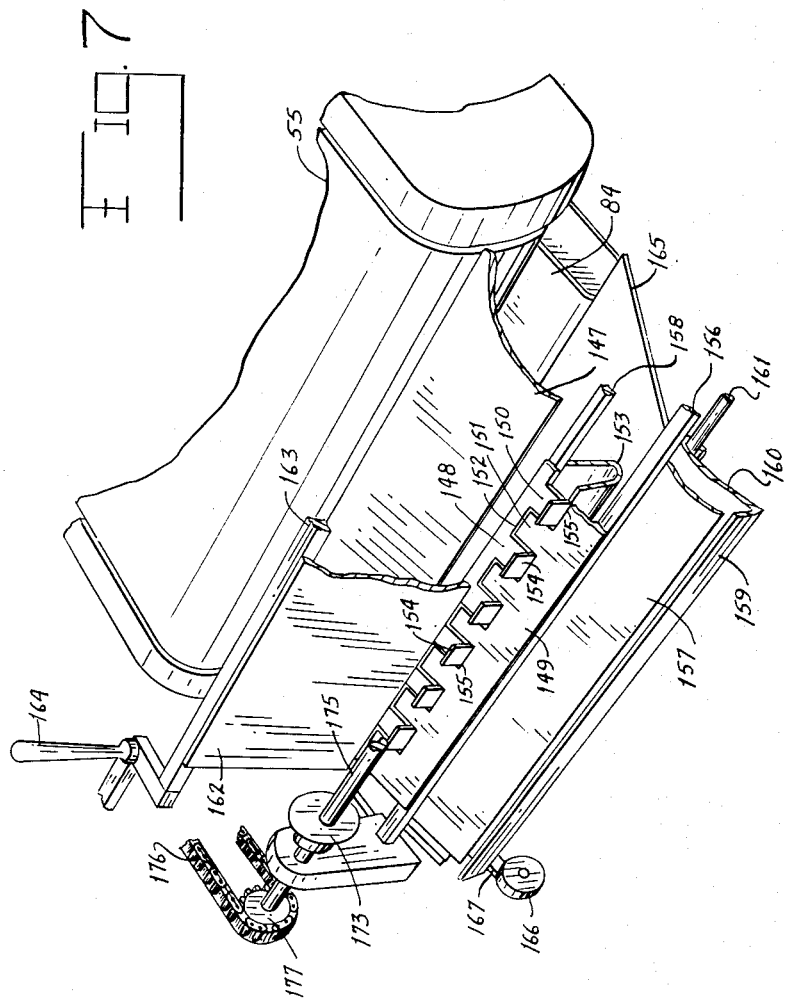
INVENTOR.
HARRISON S. GIPE
BY Joshua R. H. Potts
HIS ATTORNEY Feb. 17, 1953 H. S. GIPE 2,628,577
PRETZEL TWISTING MACHINE
Filed March 18, 1947 17 Sheets-Sheet 7
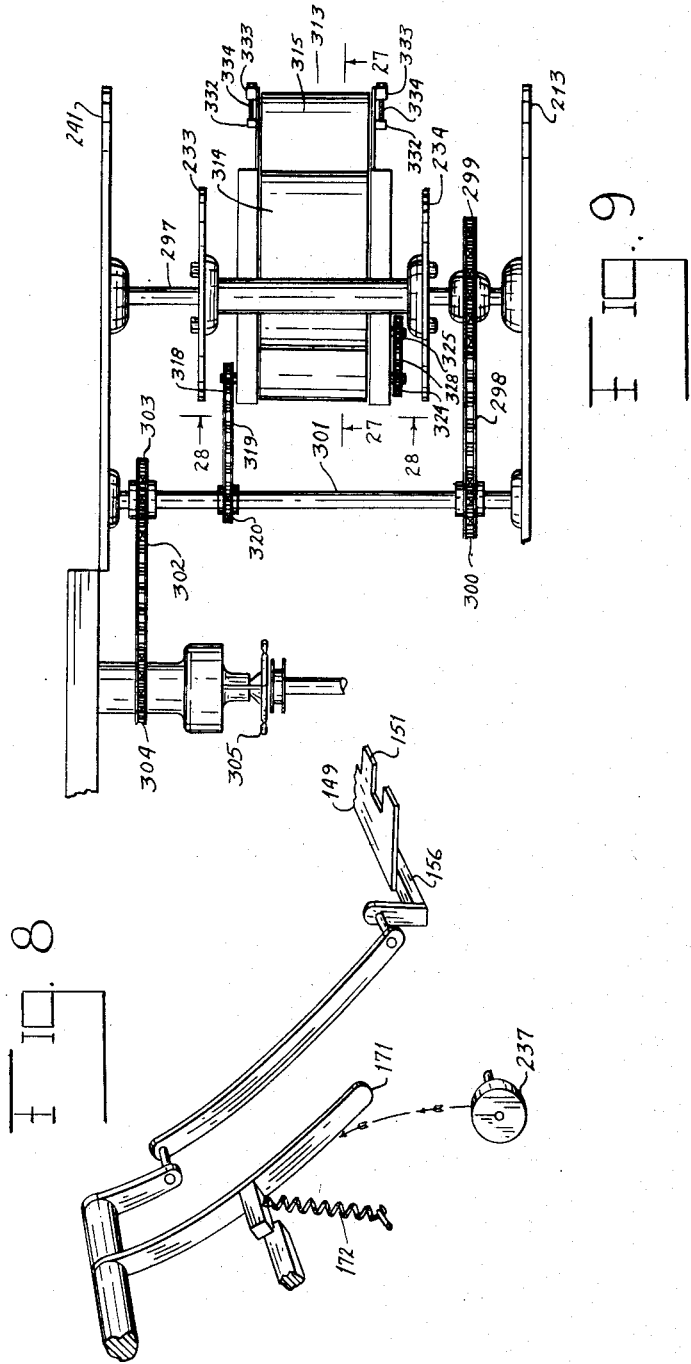
INVENTOR.
HARRISON S. GIPE
BY Joshua R. H. Potts
HIS ATTORNEY

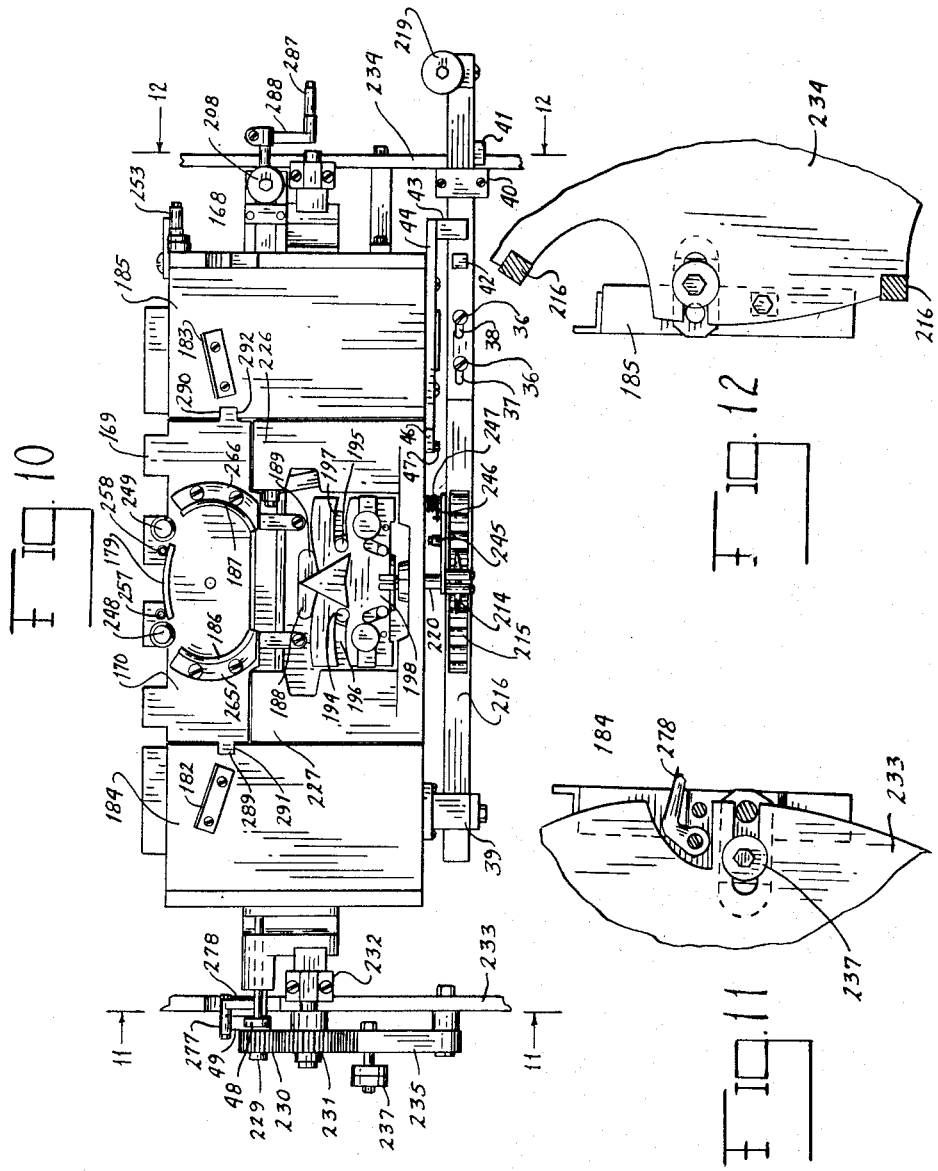

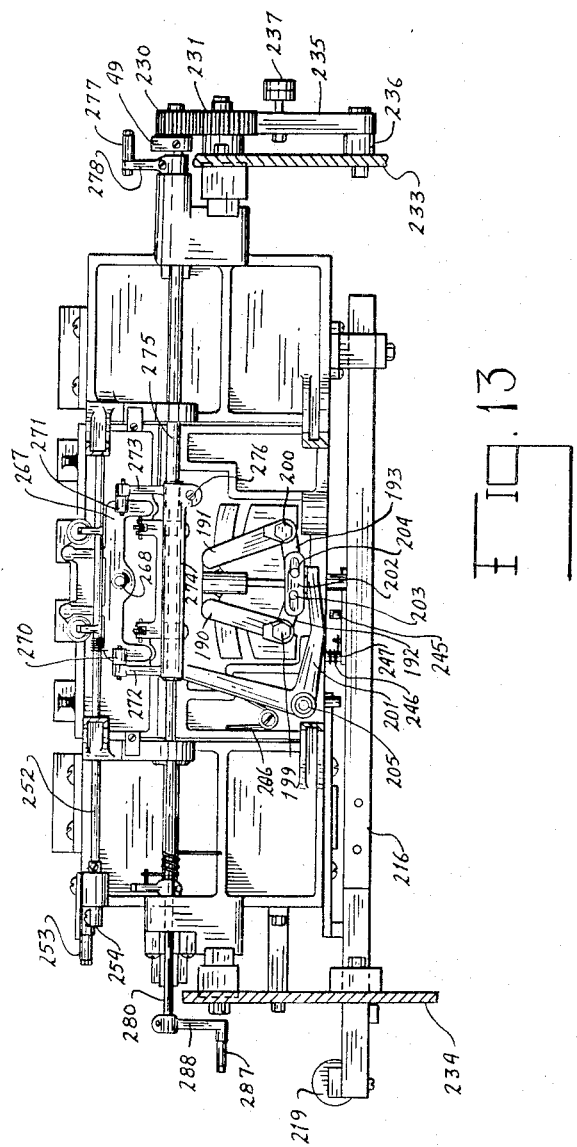

Feb. 17, 1953 — H. S. GIPE — 2,628,577
PRETZEL TWISTING MACHINE
Filed March 18, 1947 — 17 Sheets-Sheet 10
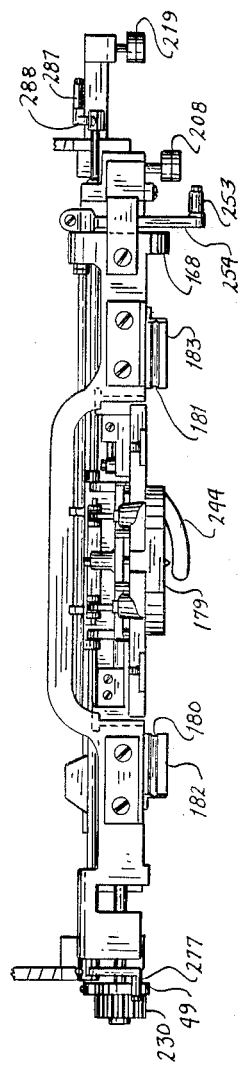
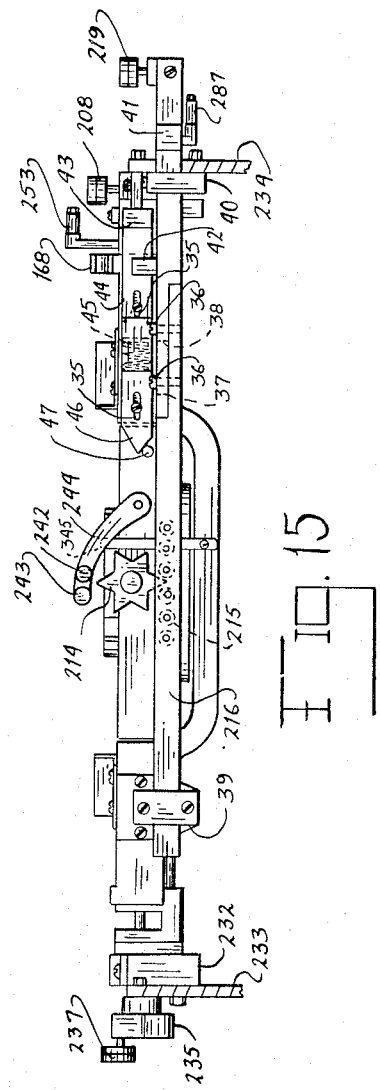
INVENTOR.
HARRISON S. GIPE
BY Joshua R. H. Potts
His Attorney Feb. 17, 1953 H. S. GIPE 2,628,577
PRETZEL TWISTING MACHINE
Filed March 18, 1947 17 Sheets-Sheet 11
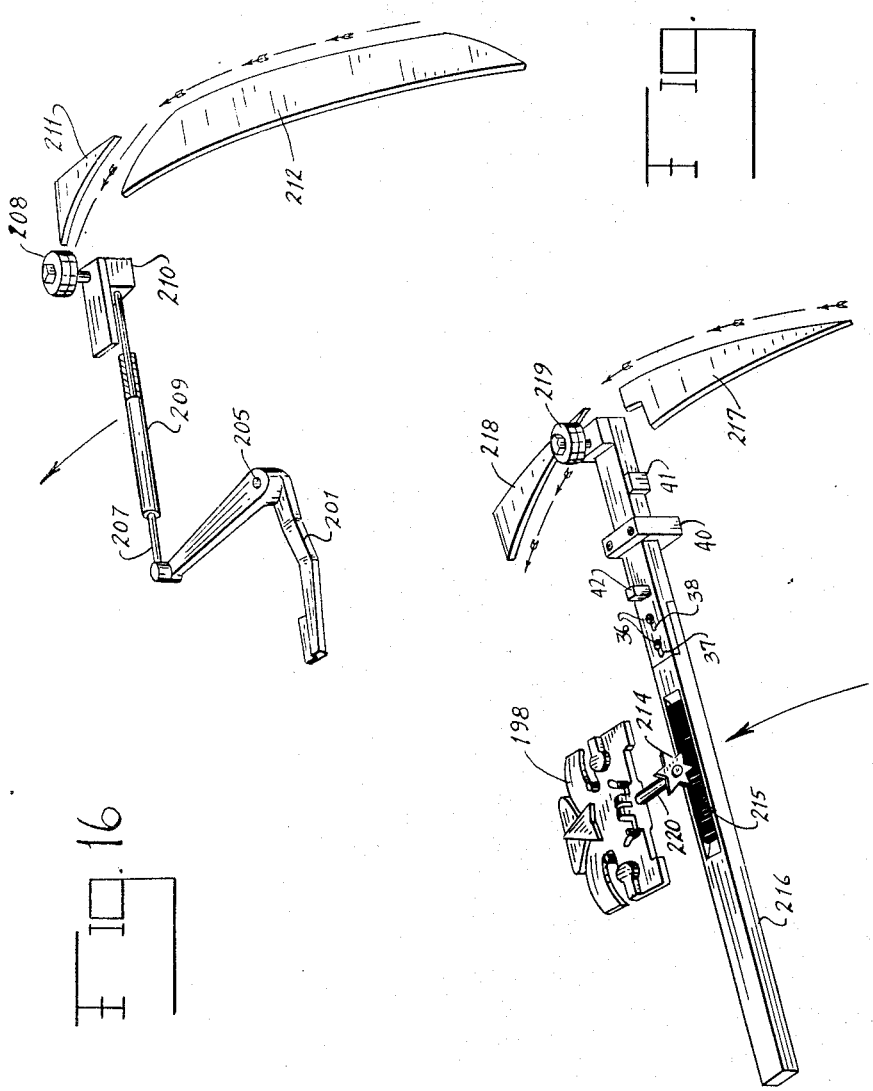
INVENTOR.
HARRISON S. GIPE
BY Joshua R. H. Potts
HIS ATTORNEY Feb. 17, 1953 H. S. GIPE 2,628,577
PRETZEL TWISTING MACHINE
Filed March 18, 1947 17 Sheets-Sheet 12

INVENTOR.
HARRISON S. GIPE
BY Joshua H. Potts
HIS ATTORNEY

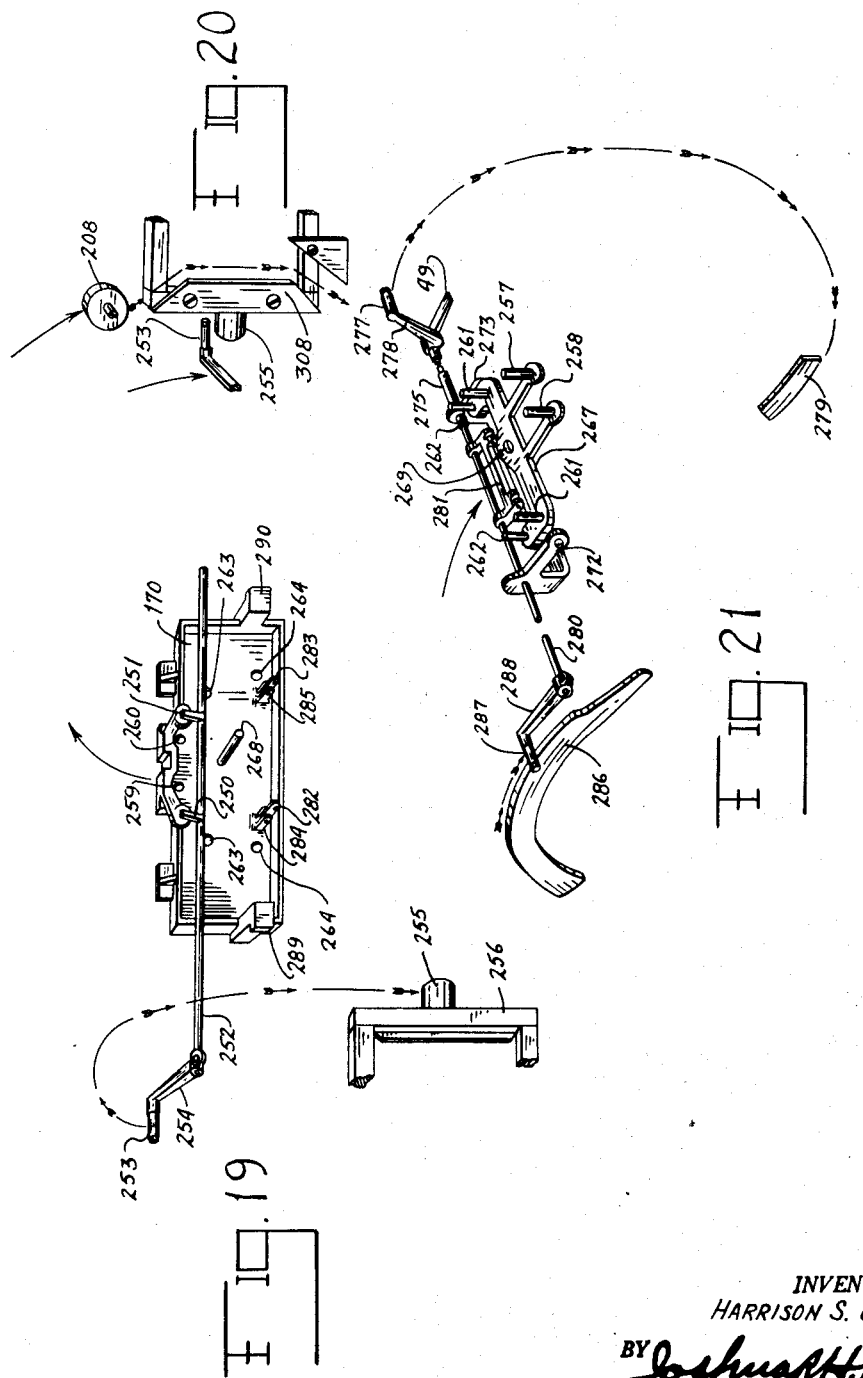

Feb. 17, 1953 H. S. GIPE 2,628,577
PRETZEL TWISTING MACHINE
Filed March 18, 1947 17 Sheets-Sheet 14

INVENTOR.
HARRISON S. GIPE
BY Joshua R. H. Potts
HIS ATTORNEY

Feb. 17, 1953  H. S. GIPE  2,628,577
PRETZEL TWISTING MACHINE
Filed March 18, 1947  17 Sheets-Sheet 15
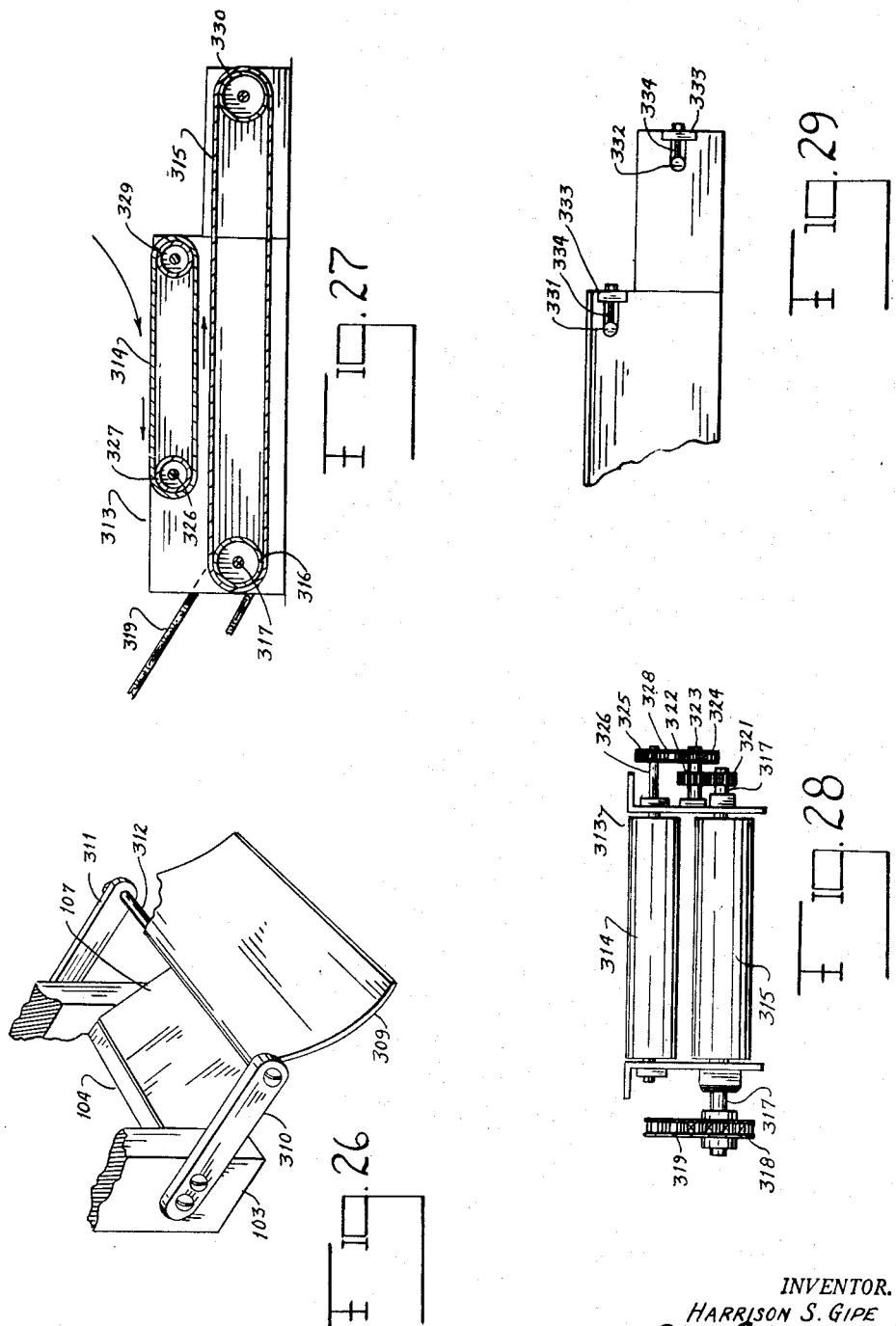
INVENTOR.
HARRISON S. GIPE
BY
HIS ATTORNEY Feb. 17, 1953           H. S. GIPE          2,628,577
PRETZEL TWISTING MACHINE Filed March 18, 1947                    17 Sheets—Sheet 16

INVENTOR.
HARRISON S. GIPE
BY Joshua H. Potts
HIS ATTORNEY

Feb. 17, 1953     H. S. GIPE     2,628,577
PRETZEL TWISTING MACHINE
Filed March 18, 1947     17 Sheets-Sheet 17
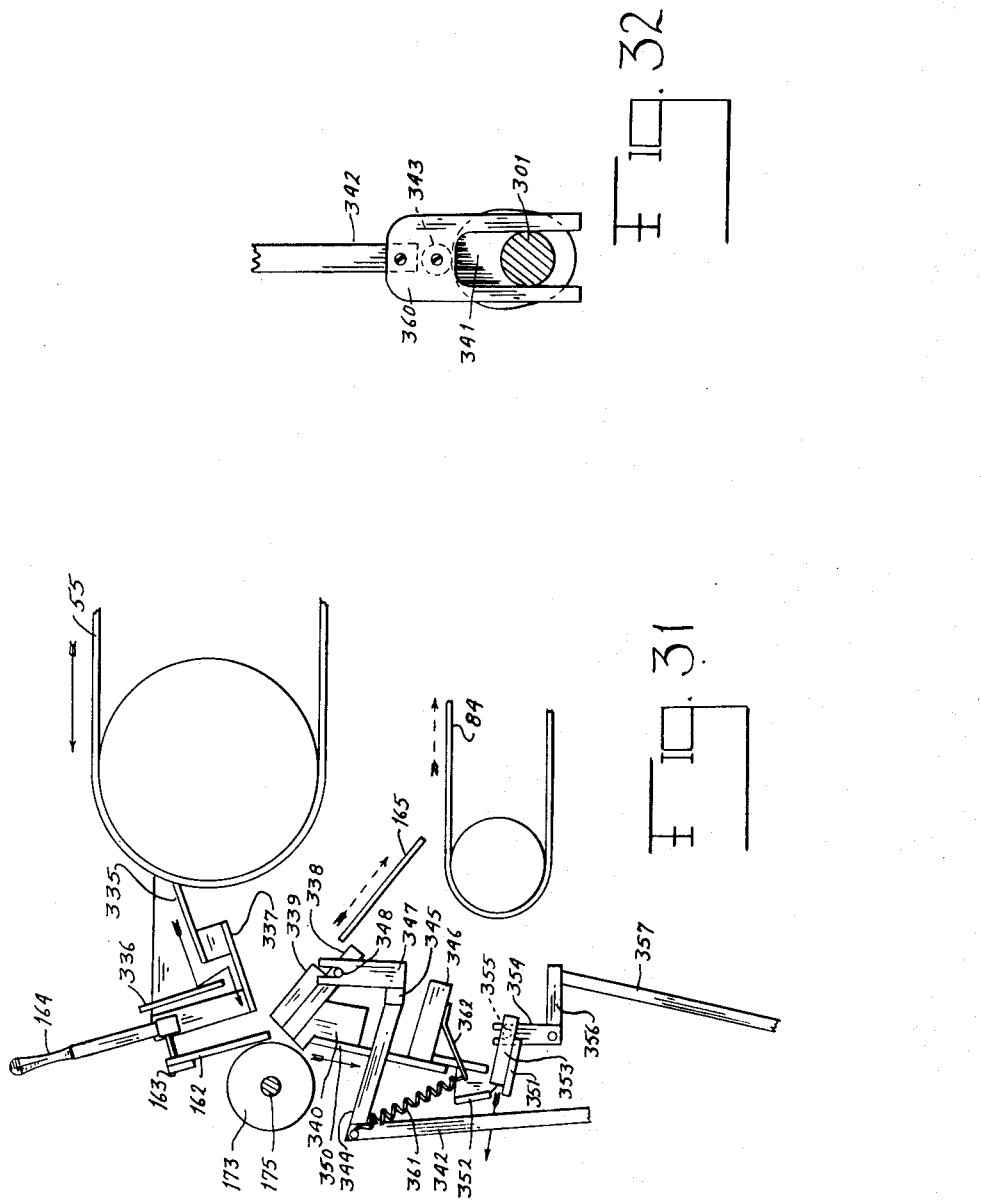
INVENTOR.
HARRISON S. GIPE
BY Joshua R. H. Potts
HIS ATTORNEY Patented Feb. 17, 1953

2,628,577

UNITED STATES PATENT OFFICE 2,628,577

PRETZEL TWISTING MACHINE

Harrison S. Gipe, Reading, Pa., assignor to Quinlan Pretzel Company, Inc., Reading, Pa., a corporation of Pennsylvania Application March 18, 1947, Serial No. 735,422

10 Claims. (Cl. 107—8)

This invention relates to pretzel making machinery, wherein dough is fed from a hopper to a cutter and rolled and shaped to form pretzels, and in particular an improved machine in which dough strips of uniform thickness are supplied from a reciprocating cutter to conveyor belts between which the dough strips are rolled and then delivered to forming and twisting units in which the ends of the dough strips are twisted together and then folded over to form the completed pretzels.

The machine of this invention is an improvement over the pretzel forming machines of my former patents, Numbers 2,026,526 and 2,090,291 in that the forming units are mounted on a rotating cylinder or drum and the instrumentalities thereof actuated by stationary cams spaced from the ends of the drum and positioned in the paths of rollers and arms associated with the forming units and extending from the ends of the drum. Other improvements such as a reciprocating knife and gravity feeder will become apparent as the description of this invention proceeds.

The purpose of this invention is to expedite machine forming of pretzels particularly by combining the forming units in a unique compact drum, wherein in the rotation of the drum the forming, twisting, and folding operations are performed on the dough strip step by step.

In the machine of the patents above referred to, thirty forming units are required to produce approximately one hundred and sixty pretzels per minute; whereas with the forming units assembled on a drum, as in the machine of this invention, six dough forming units produce one hundred and twenty pretzels per minute.

With this thought in mind, this invention contemplates an improved pretzel forming machine wherein the dough is cut into dough strips with a reciprocating knife, carried to a feeder by a conveyor, and fed by gravity to individually actuating forming units on the surface of a drum, shaped to form pretzels in the units, and eject them from the units.

In forming pretzels, it has been found difficult to form the comparatively small long strip of material, and to facilitate accomplishing this, the machine of this invention provides a twin screw feeder by which the material is fed from mixing hoppers to reciprocating cutting knives, wherein it is possible to provide a strip of material of uniform thickness throughout its length.

Machines involving twisting and bending jigs, such as knot tying machines, are subjected to severe punishment because of the weight of the operating parts due to the force required to actuate elements by cams, and with this thought in mind, the machine of this invention is of rugged construction with the parts designed and journaled for long wear.

Automatic machines, particularly for edible products and the like, must necessarily be designed for rapid and continuous operation, and to accomplish this end, this machine is designed so that the parts are readily accessible for repair and replacement.

In machines of this type having a plurality of steps wherein products progress from one step to another, it is essential that all of the movements are positively synchronized, and, therefore, this machine is operated by a single motor with the gear ratios of the different parts obtained by gears, sprockets, and pulleys of different sizes.

The object of this invention is, therefore, to provide an improved automatic pretzel twisting machine in which material of uniform thickness is rolled and fed to forming and twisting jigs on a drum or cylinder, wherein the jigs are actuated to perform the different operations progressively by cams, rollers, and gears at the ends of the drum.

Another object of the invention is to provide a pretzel twisting machine in which the ends of the material are impressed, after twisting, into intermediate portions of the material.

Another object of this invention is to provide a pretzel twisting machine in which one end is completely twisted around the other end of the material of the pretzel.

Another object of the invention is to provide a pretzel twisting machine in which small rolls of material are fed consecutively to a forming drum, wherein the steps of forming, twisting, and bending may be performed while additional rolls of material are being supplied to the drum.

In the manufacture of automatic machines of this type in which a plurality of operations are combined in one machine, it is customary to simplify the construction as much as possible, and for this reason, it is a further object of the invention to use standard parts, such as gears, sprockets, pulleys, chains, belts, and shafting as far as possible.

In order to obtain perfect succession of operations of automatic machines of this type, it is also essential that all movements be synchronized, and with this thought in mind, the machine of this invention is operated by a single motor, and the speed of operation of the individual stages is controlled by gears, sprockets, and pulleys of different pitch diameters.

A further object of the invention is to provide a pretzel forming and twisting machine which is of a comparatively simple and economical construction.

Various other more detailed objects and advantages of the invention, such as arise in connection with the manufacture and design of the pretzel forming and twisting machine in accordance with the above-mentioned objectives will in part become apparent and in part be hereinafter stated as the description of the invention proceeds.

More in detail, the invention has in view the provision of a supporting structure which serves to operatively mount various parts of the mechanisms included therein. The supporting structure must be readily assembled and disassembled as occasion demands, and an important phase of the invention is the novel constructional features imparting these properties thereto. It is important that the supporting structure be so designed that the machine may be readily manipulated and handled under conditions of practical usage.

In order to meet present day conditions prevailing in the use and demand for products of this type, and particularly in view of the fact that this machine twists the pretzels automatically, it is necessary that the operating instrumentalities of the machine be effective for driving the respective parts at relatively high speeds.

The creation of these high speeds is responsible for sharp shocks, jars, and conditions in the machine which necessitate compensating strengthening of the materials and parts which insure against breakage, and to accomplish this end, the machine and parts thereof are designed to withstand shock and thereby extend the service life of the machine.

More in detail, the invention embodies a supporting frame having a supply hopper at one end, twin screw conveyors for feeding the material from the hopper to reciprocating cutting knives, a conveyor positioned to receive strips of material from the knives, a superimposed conveyor spaced from the former conveyor and traveling at a slightly higher speed, a feeder for receiving rolled products from the conveyors and positioning the products in forming jigs on a drum, means actuating the forming jigs in the progressive rotation of the drum to take the products in the form of an inverted U, indent the sides adjacent the open ends, twist one end around the other, and then bend the twisted ends upward over the intermediate portion, impressing the tips of the ends into the said intermediate portion, a motor, and suitable sprockets, gears, pulleys, chains, belts, cams, and mechanical instrumentalities for progressively operating the parts of the various stages of the machine.

For a full and more complete understanding of the pretzel forming and twisting machine of this invention, reference may be had to the following description and accompanying drawings, wherein:

Figure 5 is a cross-section through the machine on line 5—5 of Figure 1, illustrating the construction of the conveyors, and showing the motor with the belts, chains, and other parts omitted.

Figure 6 is a cross-section through the conveyors on line 6—6 of Figure 1 showing levers mounted on the lower conveyor frame for raising and lowering the upper conveyor assembly.

Figure 7 is a view illustrating the relative positions of the parts of the feeders that receive the products from the conveyors and feed them to the jigs on the forming and twisting drum.

Figure 8 is a detail showing a trip actuated lever for operating the feeder mechanism.

Figure 9 is a plan view of the drive mechanism for rotating the forming, twisting, and bending drum.

Figure 10 is an elevational plan illustrating one of the units of the drum.

Figure 11 is a detail showing a section on line 11—11 of Figure 10 illustrating recesses cut into the side plate to facilitate mounting of the forming units, and showing other parts of an end of one of the units of the drum at one side of the drum.

Figure 12 is a similar view on line 12—12 of Figure 10 showing the recesses in the side plate at the other side of the drum.

Figure 13 is a view looking toward the opposite side of the unit shown in Figure 10.

Figure 14 is a side elevation looking downward from the upper side of the unit shown in Figure 10.

Figure 15 is a view in elevation looking upward at the lower side of the unit shown in Figure 10.

Figure 16 is a detail showing the cam with its associated roller and lever for actuating the forming elements that indent the sides of the pretzel.

Figure 17 is a similar view illustrating the cam and its associated roller and arm that actuates a star wheel for twisting the ends of the pretzel together.

Figure 19 is a view showing a supporting element of the forming jig illustrating in particular pusher elements for impressing the tips of the ends of the sides of the pretzel into the intermediate part thereof.

Figure 20 is a detail showing the actuating cam surfaces of the pusher elements, and showing the cam track associated with the roller shown in Figure 16 for releasing the indenting elements at this point.

Figure 21 is a view illustrating the pretzel ejecting elements of the drum with the associated lever and cam, and also levers and a cam for moving the plate shown in Figure 19.

Figure 26 is a perspective view of the fabric baffle which is mounted over the discharge end of the outlet orifice of the knife assembly.

Figure 27 is a section through the discharge unit on line 27—27 of Figure 9.

Figure 28 is an end elevation of the discharge unit as viewed on line 28—28 of Figure 9.

Figure 29 is a fragmentary side elevation of the discharge unit illustrating take-up devices for the upper and lower conveyor belts of the discharge unit.

Figure 31 is a diagrammatical side elevation of the feeder illustrated in Figure 30.

Figure 32 is a sectional side elevation illustrating the structure for connecting the actuating arms of the feeder to a rotating shaft.

Figure 1:
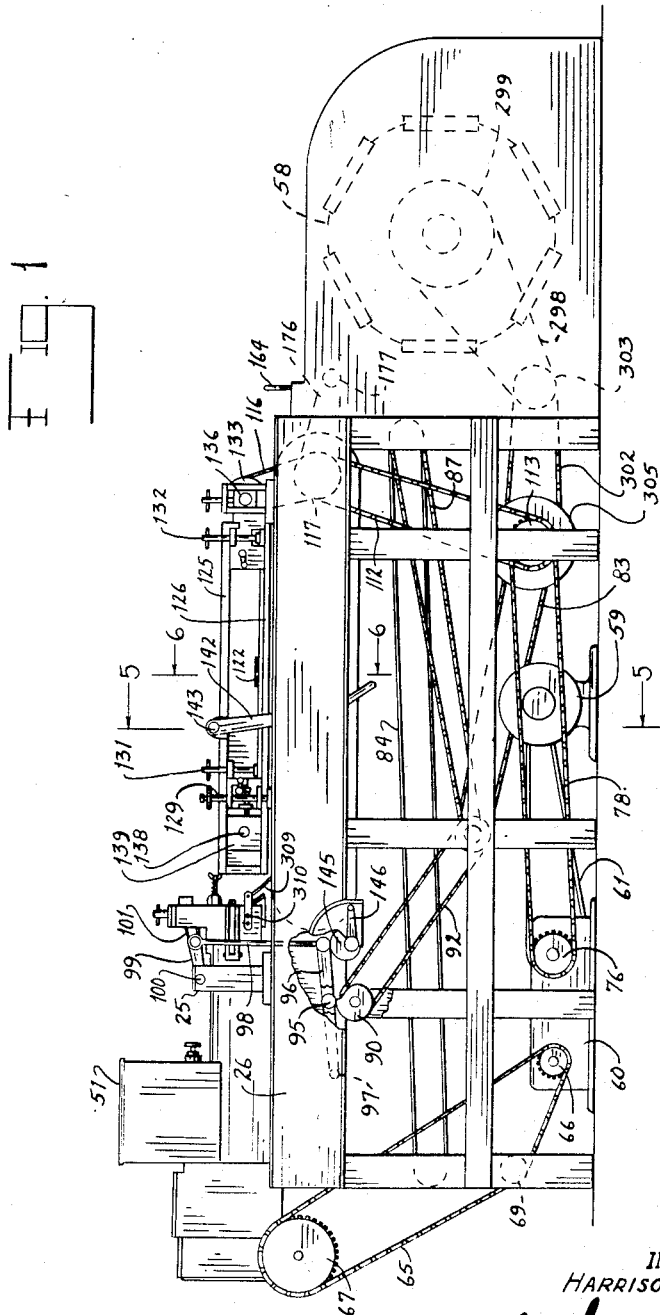
Figure 1 is a view showing a side elevation of the machine with part of one of the side beams broken away showing a cam for actuating a reciprocating knife with adjusting means associated therewith.
Figure 2:
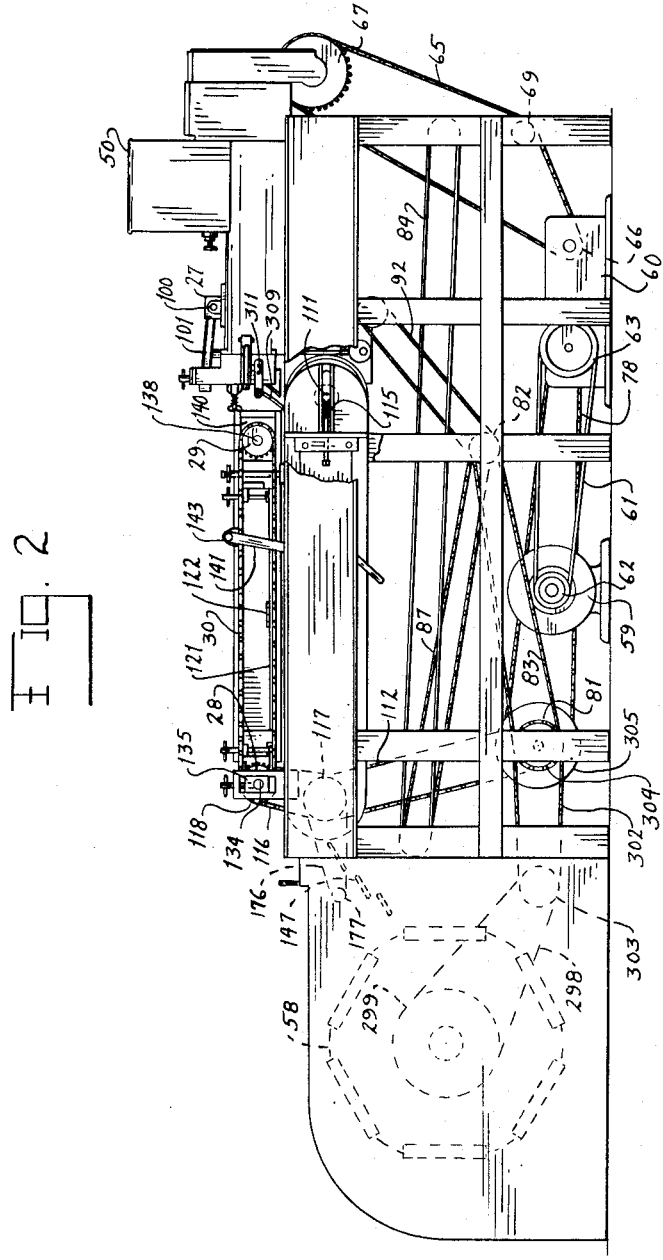
Figure 2 is a view showing a side elevation looking toward the opposite side of the machine; also with part of a side beam broken away, illustrating a take-up device for adjusting the main conveyor.
Figure 3:
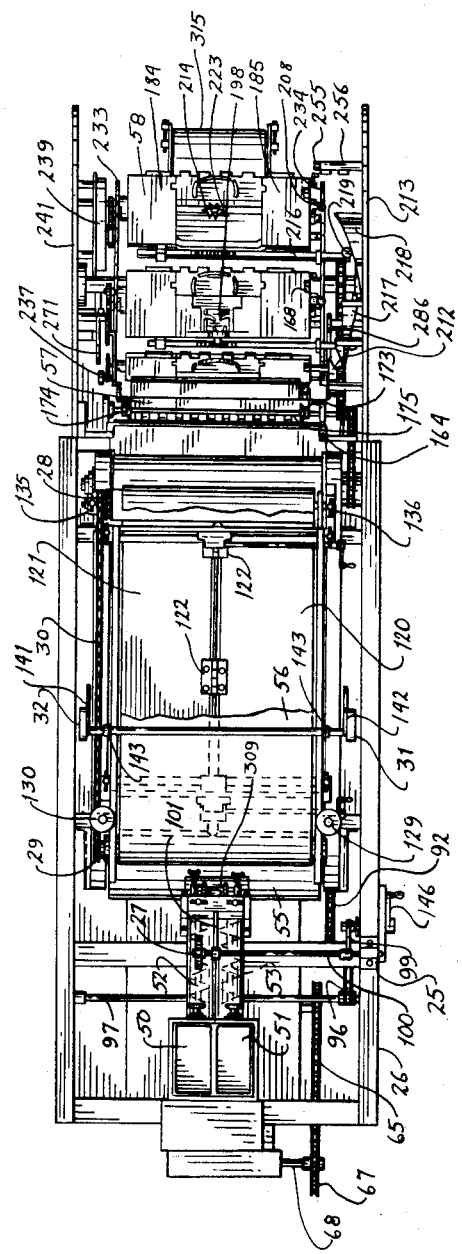
Figure 3 is a plan view of the machine with part of the upper section of the upper conveyor belt broken away showing the hinged platform therein.

Referring now to the drawings, wherein like reference characters denote corresponding parts, the pretzel forming and twisting machine of this invention includes supply hoppers 50 and 51, twin screw feeding conveyors 52 and 53, a reciprocating knife 54, a main conveyor 55, a coacting superimposed conveyor 56, a feeder 57, and a forming and twisting drum 58.

In the design shown, the machine is operated by a motor 59 which drives a reduction gear 60 through a belt 61 on pulleys 62 and 63. The reduction gear drives the hopper feeder 64 and screw conveyors 52 and 53 through a chain 65 from a sprocket 66, which drives a sprocket 67 on a shaft 68, the chain 65 traveling over a take-up idler 69. A worm gear 70 on the shaft 68 meshes with a gear 71 on the shaft 72 of the screw conveyor 52, and the shaft 72 is provided with a gear 73 that meshes with a similar gear on the shaft of the screw conveyor 53 and also with a gear 74 on the shaft 75 of the hopper feeder 64.

Figure 4:
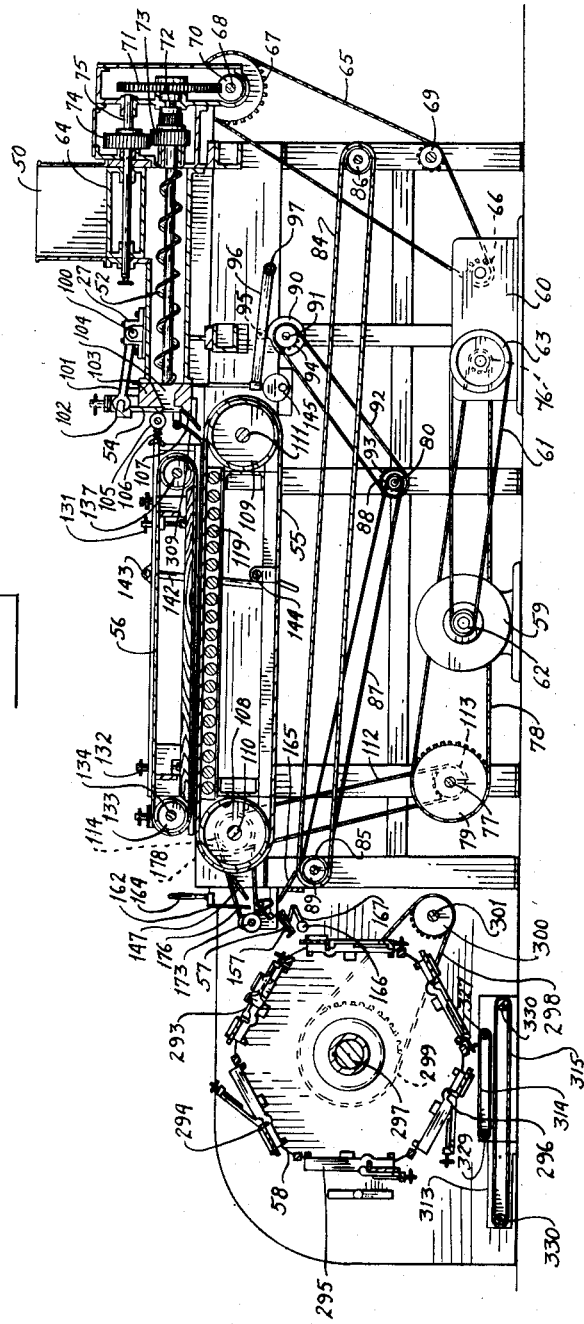
Figure 4 is a longitudinal section through the machine illustrating the relative positions of the parts.

The reduction gear 60 is also provided with a sprocket 76 that drives a main drive shaft 77 through a chain 78 and a sprocket 79, and the shaft 77 drives a jack shaft 80 through sprockets 81 and 82 and a chain 83. The jack shaft 80 drives a return conveyor 84 having pulleys 85 and 86 at the opposite ends thereof, by a chain 87 and sprockets 88 and 89, as shown in Figure 4. The jack shaft also drives a cam 90 on a shaft 91 through a chain 92 and sprockets 93 and 94, and the surface of the cam engages a roller 95 between a pair of arms 96 that are pivotally mounted at one end on a shaft 97. The opposite ends of the arms 96 are connected by a rod 98 to an arm 99, pivotally mounted at one end on a shaft 100. The shaft 100 is retained in a bearing 25 mounted on a channel member 26 and a bearing 27 mounted over the screw feeding conveyor 52. Congruent with the center line of the knife 54, an arm 101 is pivotally mounted on the shaft 100, and the opposite end of the arm 101 is in engagement with an upper bar 102 of the knife 54. The knife is resiliently urged against a block 103 having an outlet orifice 104 therein by a roller 105 with a spring 106 associated therewith, and after being cut, the strips of material drop downward over a guide 107 to the main conveyor 55. To aid in placing the dough strips on the main conveyor 55, a fabric baffle 309 is draped transversely forward of the outlet orifice 104 and is held extended over the guide 107 by arms 310 and 311. The arms 310 and 311 are attached at one end to the block 103 and support at the opposite end a dowel 312 on which the fabric baffle 309 is mounted.

The conveyor 55 comprises an endless belt having head and tail pulleys 108 and 109 respectively, the head pulley being mounted on a shaft 110 and the tail pulley mounted on a shaft 111. The conveyor is driven through the head pulley by a chain 112 from the main drive shaft 77 with the chain traveling over sprockets 113 and 114. The ends of the shaft 111 of the tail pulley are mounted in take-up bearings 115, wherein slack may be taken up in the conveyor belt. The superimposed conveyor 56 also comprises an endless belt with the under surface spaced sufficiently above the upper surface of the belt 55 to permit rolls of material of predetermined size to roll therethrough. The conveyor 56 is driven by a chain 116 on pulleys 117 and 118, and it will be noted that the driven pulley 118 is of a smaller diameter than the pulley 117, wherein the pulley 118, and consequently the belt of the conveyor 56, will travel faster than the belt of the conveyor 55 so that rolling action will take place, and the material will be rolled as it passes along the conveyors.

The upper section of the belt of the conveyor 55 is supported on transversely disposed idler rollers 119, and the lower section of the belt of the upper conveyor 56 is held downward by hinged platforms 120 and 121 divided longitudinally at the center and connected by hinges 122. The sections of the platform are provided with outwardly extending handles 123 and 124, and the conveyor is mounted in side bars 125 and 126 which are adjustably suspended above side rails 127 and 128 of the main conveyor frame by adjusting screws 129 and 130. The elevation of the sections 120 and 121 of the platform is also adjusted by adjusting screws 131 at one end and 132 at the other. The sprocket 118 which drives the head pulley 133 of the conveyor 56 is mounted on a shaft 134, the ends of which are held in adjusting bearings 135 and 136, wherein the end of the conveyor may be adjusted in elevation in relation to the conveyor 55. A tail pulley 137 at the opposite end of the conveyor 56 is mounted on a shaft 138 that is held in take-up bearings 139 and 140. A sprocket 28 is mounted next to the sprocket 118 on the shaft 134, and is connected to a sprocket 29 on the shaft 138 of the tail pulley 137 by a chain 30 to promote even distribution of power.

The upper conveyor 56 is, therefore, substantially floating in that either end or any part thereof may be elevated or lowered to maintain operative relation thereof with the lower conveyor 55. The conveyor 56 is also provided with lifting means in the form of depending arms 141 and 142 pivotally mounted in bearings 143, and positioned to be attached to arms 31 and 32 which are pivotally mounted on a shaft 144 which is retained in bearings 33 and 34 secured to the lower section of the conveyor 55.

The reciprocating action of the knife 54 is also adjustable through an eccentric cam 145 actuated by an arm 146, as shown in Figure 1, wherein with the eccentric cam 145 positioned under the end of the arm 96, downward movement of the rod 98, and, therefore, of the knife may be controlled.

With the machine operating, dough is placed in the hoppers 50 and 51 and fed by the rollers 64 to the screw conveyors 52 and 53 by which it is supplied to the reciprocating knife 54 which cuts the dough into elongated strips that pass down the chute 107 to the conveyor belt 55. The dough strips are carried between the conveyors 55 and 56, and with the conveyor 56 traveling at a higher speed than the conveyor 55, the strips are rolled, providing round strips that drop by gravity from the belt of the conveyor 55 upon the apron 147, as illustrated in Figure 7. From the apron 147, the dough strips roll to the plates 148 and 149, the adjoining edges of which are provided with meshing fingers 150 and 151, the fingers 151 dovetailing in slots 152 between the fingers 150. The plate 148 is formed in a U-shaped support 153 having projecting fingers 154 on one edge thereof that extend upward through notches 155 between the fingers 151 and are held on a bar 158. The fingers 154 extending outward from the surface of the plate 149 between the ends of the fingers 150 and the inner ends of the notches 155, providing means for stopping the dough strips. These fingers 154 arrest the progress of the dough strips to give both ends of the strips an opportunity to catch up, in the event they are not delivered from the conveyor 55 absolutely even or in a transverse position. The dough strips remain against the fingers 154 until the plate 149 is actuated by the bar 156 upon which the plate 149 is mounted, so that the plate 149 moves upward through the slots, and thereby releases the dough strips which roll from the plate 149 to a baffle 157. At the lower edge of the baffle 157, the dough strips engage a flange 159 of an L-shaped plate 160, which is supported on a bar 161.

Above the plates 148 and 149 is a substantially vertical baffle 162 suspended from a bar 163, and the baffle 162 may be actuated by a handle 164 to arrest and divert culls backward upon an apron 165 by which they are delivered to a return conveyor 84 positioned below the main conveyor 55. The baffle 162 may also be used to return dough strips to the opposite end of the machine if, for any reason, it should not be desired to deliver the dough strips to the forming unit 58.

From the flange 159 of the plate 160, the dough strips are picked up by the forming units in which they are formed and twisted to form pretzels as illustrated in Figures 22 to 25 inclusive.

Figure 18:
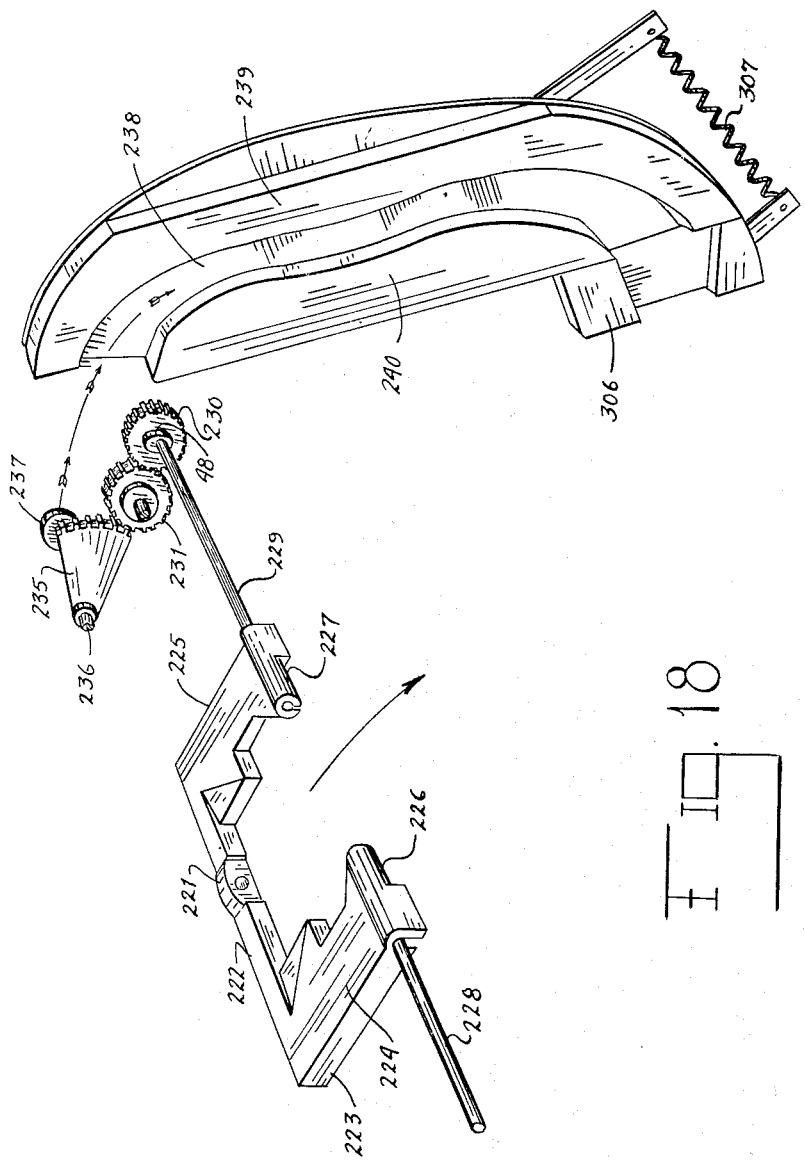
Figure 18 is also a similar view illustrating the cam track with its associated roller and block which bends the pretzel over.

To release the dough strips from the flange 159, a roller 166 connected to the bar 161 by a knee joint 167 is engaged by a hook 168 on the end of the forming unit which moves the flange downward, wherein the dough strip is free to roll from the baffle 157 so that it may be picked up by the fingers 169 of the swinging plate 170 shown in Figure 10. At the same time, the bar 156 is actuated by a roller 237, which is attached to a gear segment 235, as shown in Figure 18. The roller strikes a lever 171 which is held in position by a coil spring 172, thereby through a series of links, as shown in Figure 8, the plate 149 is swung upward to release another dough strip from the fingers 154, in which position the ends of the strips are trimmed evenly by rotary knives 173 and 174 on a shaft 175 which is rotated from the head shaft 110 of the conveyor 55 through a chain 176 and sprockets 177 and 178.

Figure 22:
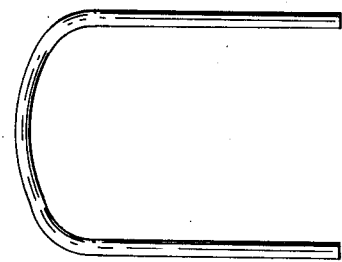
Figure 22 is a view illustrating the material in the inverted U-shaped form in which it appears immediately after delivery to the forming units.

The dough strip drops from the baffle 157 by gravity, falling against the fingers 169 and over the arcuate section 179 of the forming die with the ends of the strip resting in grooves 180 and 181 of clip angles 182 and 183 on the faces of the side pieces 184 and 185. As the movement of the forming unit continues, its own weight causes the dough strip to droop with the ends thereof hanging downward around the arcuate end sections 186 and 187 of the die assuming the shape of an inverted U, as shown in Figure 22.

Figure 23:
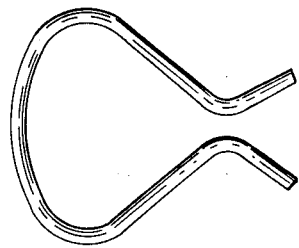
Figure 23 shows the material of the pretzel after the first forming step, in which the sides have been indented.
Figure 25:
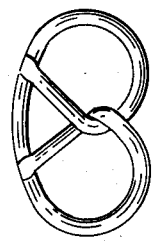
Figure 25 shows the completed pretzel after the ends have been bent over and the tips thereof impressed into the material of the intermediate part of the pretzel.

In the next step, the downwardly extending ends of the dough strip are bent inwardly, as shown in Figure 23, by shoes 188 and 189 suspended from the ends of arms 190 and 191 of bell cranks with short legs 192 and 193. The bell cranks are provided with pins 194 and 195 on the arms 190 and 191, which extend into arcuate slots 196 and 197 in the twister 198. The bell cranks are pivotally mounted on pins 199 and 200, and these are actuated by a lever 201 through a slotted cross member 202 into which pins 203 and 204 on the ends of the legs 192 and 193 extend. The lever 201 is pivotally mounted on a pin 205 and resiliently held in the position shown in Figure 13 by a spring 206. The upper end of the lever 201 is pivotally attached to a bar 207 which connects the lever to a roller 208 through a sleeve 209 and a bearing block 210, as shown in Figure 16. The roller 208 contacts cam surfaces 211 and 212 on a side plate 213 of the frame in which the forming unit is positioned, and as the roller rolls off of the surface 212, it is forced inward by the spring 206, and the cam 211 thereby moves the upper end of the lever 201 inward toward the center of the machine. In this action, the lower end of the lever draws the legs 192 and 193 of the bell cranks downward and the upper ends 190 and 191 inward, wherein the shoes 188 and 189 contact the ends of the dough strip and bend the ends inward, as shown.

Figure 24:
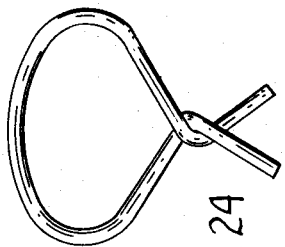
Figure 24 illustrates the material of the pretzel after the second step in which the ends thereof have been twisted together.

In the next step, the ends of the dough strip are twisted, as shown in Figure 24, by the twister 198, which is rotated through a complete revolution by a star wheel 214 that is actuated by a plurality of rollers 215 in a bar 216, the bar being moved longitudinally by cam surfaces 217 and 218 through a roller 219. The cam surfaces 217 and 218 are also mounted on the side plate 213 of the machine frame.

The bar 216 is formed in two pieces so that the head screws 36 may be moved in the slots 37 and 38 to adjust the bar 216 to a desired length. The bar 216 is retained in a bearing 39, which is attached to the side wall 184, and in the bearing 40, which is attached to the side plate 234. A stop 41 is provided on the bar 216 to keep the roller 219 in position to engage the cam 217.

Immediate after the bar 216 has turned the star wheel 214 through a complete revolution of 360 degrees, a projection 42 on the bar 216 engages an arm 43 which is permanently attached to a bar 44. The bar 44 is mounted under the side wall 184 by two head screws movable along the bottom of the side wall 184 in slots 35. Therefore, when the projection 42 engages the arm 43, the bar 44 is drawn outwardly against a flat compression spring 45, releasing from the hold of the triangular-shaped end 46 of the bar 44 a pin 47 which is press fitted into the under side of a twister yoke 223. This action unlocks the twister yoke 223 and allows it to perform the next operation.

The twister 198 is pivotally mounted through a shaft 220 in a bearing 221 in a base 222 of the twister yoke 223, which is formed with side parts 224 and 225, as illustrated in Figure 18, and the yoke is hingedly mounted through hubs 226 and 227 on shafts 228 and 229, and the shafts are rotatably mounted on the side plates 184 and 185. On the outer end of the shaft 229 is a gear 230 that meshes with a gear 231 mounted in a bearing 232 on a side plate 233 of the forming unit 58, the forming unit having a corresponding side plate 234 at the opposite side. The gear 231 meshes with the gear segment 235, pivotally mounted on a pin 236, and the segment is provided with the roller 237 positioned to travel in a cam slot 238 between cams 239 and 240, as shown in Figure 18. With the cams mounted on the stationary side plate 241 of the frame of the machine, the roller 237 entering the cam slot 238 in the direction of the arrows actuates the gears through the gear segment, wherein the twister yoke swings the twister about the pivot point or hinge against the other or upper section of the die, with the forming unit positioned as shown in Figure 10. During this folding action, the twister is held through the star wheel 214 by the pins 242 and 243 in the arm 244 which is actuated by a pin 245 and resiliently held by a spring 246 on the pivot pin 247 thereof.

As the roller 237 enters the cam track 238 and the twister yoke 223 is turned through 180 degrees, a cam 48 on the shaft 229, as shown in Figure 18, is rotated against a lever 49, as shown in Figure 21. The lever 49 is acted upon by the cam 48, drawing the pick-up plate 170 back through the slots 291 and 292 and allowing the twister yoke 223 to swing up flush against the front face of the pick-up plate 170.

In the next step, the extreme tips at the ends of the dough strip are mashed into intermediate portions of the strip by paster heads 248 and 249 slidably mounted in openings extending through the pick-up 170. The paster heads are actuated by arms 250 and 251 on a shaft 252, and the shaft is rotated by a handle 253 on a crank arm 254 which travels in the direction of the arrows, as shown in Figure 19, and turns as it engages a knob 255 on a cam bracket 256.

At this time, the roller 208, which remains in its closed position until it reaches the cam track 308, shown in Figure 20, is drawn out and the dough strip is released from the grip of the shoes 188 and 189 to permit the twister yoke 223 to move away in the next step from the pick-up plate 170 without pulling the dough strip from the die.

In the next step, the roller 237 is acted upon by the cam surface 240 about midway through the cam track 238. This cam action pushes the gear segment 235 back to its normal position and in so doing, returns the twister yoke 223 through 180 degrees back to its normal position. At the lower end of the cam track 238, the cam surface 240 is continued by a loosely attached piece 306 which is kept in tension by a spring 307, as shown in Figure 18. This device gives added pressure to the roller 237, making certain that the twister yoke 223 closes and helping the pin 47 to push back the spring 45, to permit the pin to lock itself behind the triangular-shaped end 46 of the bar 44.

After the twister yoke is returned to its normal position, the formed pretzel is ejected from the forming unit by ejector pins 257 and 258 which extend through openings 259 and 260 in the pick-up plate 170 and pins 261 and 262 that extend through openings 263 and 264 in the pick-up plate and engage arcuate plates 265 and 266 on the peripheral edges of the arcuate flanges 186 and 187. The ejector pins are mounted on a yoke 267 that is positioned by a pin 268 extending from the pick-up plate into an opening 269 in the yoke, and the yoke is pivotally mounted through bearings 270 and 271 thereon in the upper ends of arms 272 and 273 extending upward from a sleeve 274 which is clamped on a shaft 275 by a bolt 276. The shaft 275 is actuated by a handle 277 of a crank 278 as the handle engages a cam 279 with the handle traveling in the direction of the arrows shown in Figure 21. It will be noted in this figure that the shaft 275 is tubular and a shaft 280 is mounted therein which has a small yoke 281 thereon, and the upper corners of the yoke 281 are attached by links 282 and 283 to the back of the pick-up plate through ears 284 and 285. This yoke through the associated links is actuated by a cam 286 through a handle 287 on a crank 288 to slide the pick-up plate back from the face of the side plates 184 and 185, the ends of the pick-up plate being provided with lugs 289 and 290 which extend into slots 291 and 292. The completed pretzel is, therefore, formed, and then ejected from the forming unit and may drop upon a chute or conveyor, or may be removed from the forming unit by instrumentalities, as disclosed in my former patents.

In the structure illustrated, a discharge unit 313 consisting of an upper conveyor 314 and a lower conveyor 315 is provided. The lower conveyor 315 is driven from the tail pulley 316 of which the shaft 317 is actuated by the sprocket 318 through a chain 319 and a sprocket 320 which is mounted on the shaft 301. Being driven directly from the shaft 301, the lower conveyor discharges forward, as indicated by the arrows in Figure 27. However, the upper conveyor 314 discharges to the rear onto the lower conveyor 315, thereby picking up the formed pretzels from the forming units in agreement with the rotation of the drum and depositing the pretzels on the lower conveyor 315 to be discharged forward of the machine.

To reverse the direction of the upper conveyor 314, a gear 321 which is mounted on the clear end of the tail shaft 317 of the lower conveyor 315 meshes with an idle gear 322, the shaft 323 of which holds a sprocket 324 which drives a sprocket 325 mounted on the shaft 326 of the upper tail pulley 327 through a chain 328.

The forward pulley 329 of the upper conveyor 314 and the forward pulley 330 of the lower conveyor 315 revolve on suitable bearings on stationary shafts, 331 and 332. The upper forward shaft 331 and the lower forward shaft 332 extend transversely through the frame of the discharge unit 313 and are engaged by screws 334 which pass through fixed lugs 333; therefore, the upper conveyor 314 and the lower conveyor 315 can be adjusted for tension by the screws 334.

Figure 30:
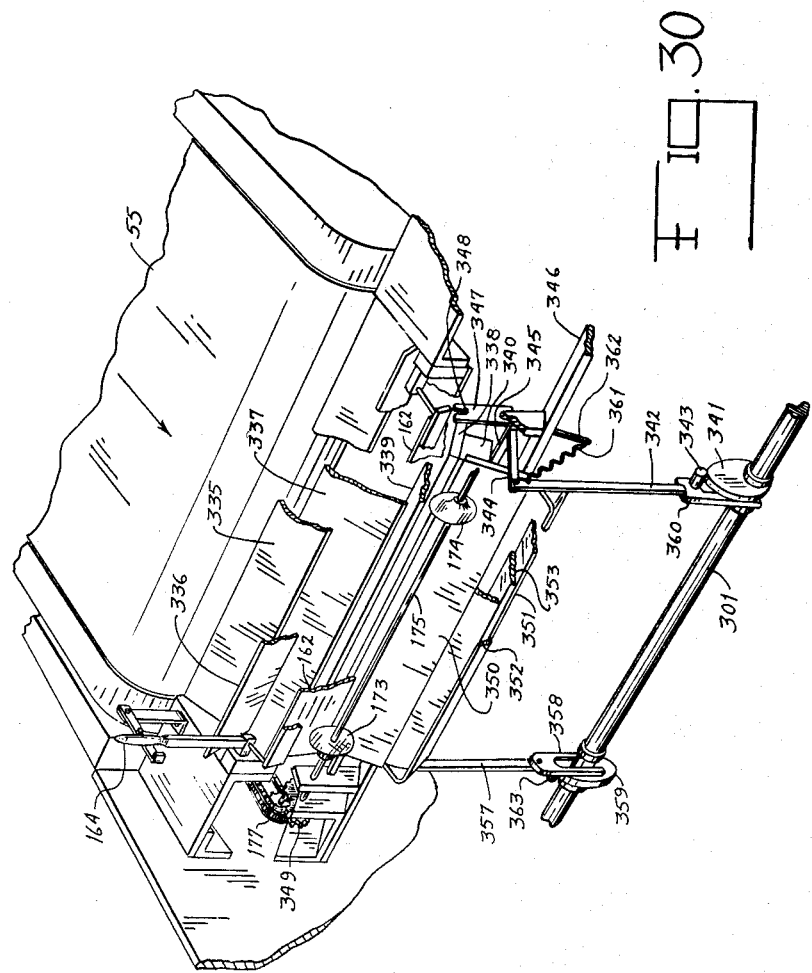
Figure 30 is a perspective view illustrating the relative positions of the parts of a modified form of the feeder shown in Figure 7.

A modified form of the feeding mechanism which directs the dough from the main conveyor 55 to the forming units is illustrated in Figure 30. In the modified form of the feeding mechanism, a transverse inclined plate 335 removes the dough strips from the main conveyor 55. The dough strips with the velocity imparted to them by the conveyor 55 strike a second plate 336 which is substantially forward of and perpendicular to the inclined plate 335. Striking the plate 336, the lagging ends of the dough strips are brought in line and the straightened strips of dough rebound to a second inclined plate 337 which is below and forward of the first inclined plate 335. At this point the dough strips may be redirected to a return conveyor, as was described in the original feeder; however, if the machine continues to operate normally, the dough strip rolls by gravity from the second inclined plate 337 onto a pusher element 338, which is mounted to push at an elevated angle. The pusher element is retained between an upper bearing plate 339 and a lower bearing 340, and is actuated by a cam 341 mounted on the shaft 301. To actuate the pusher element 338 from the cam 341, an arm 342 is held to the shaft 301 by a forked joint 360 which saddles the shaft 301 and carries a roller 343 which rides on the cam 341. The upper end of the arm 342 is pivotally attached to a bar 344 which in turn is attached to a square shaft 345. The lower end of a plate 347 is mounted on the shaft 345 and the upper end is forked and constructed to saddle a pin 348 which is retained in the pusher element 338, thereby allowing the cam 341 to slide the pusher element 338 back and forth. A coil spring 361 is attached between the joint of the bar 344 and the arm 342 to an extension 362 which is fixedly secured to a permanent bracket 346, thereby giving assurance that the arm 342 will be drawn down at the proper time.

When the pusher element 338 pushes the dough strips outwardly, the ends of the strips are trimmed evenly by rotary knives 173 and 174 on a shaft 175 which is the same as the cutting device described originally. The shaft 175 of the knives 173 and 174 can be actuated by the sprocket 177 through reduction gears 349.

The dough strips, after being trimmed by the knives 173 and 174, roll down a plate 350 and come to rest on a horizontal plate 351. The strips are kept from bouncing from the plate 351 by a plate 352 which forms an acute angle with the plate 350 forming thereby a trough with a transverse opening in its lower edge. This is more easily seen in Figure 31 in which the solid arrows indicate the path of the dough in normal operation and the dotted arrows indicate redirected dough. As the dough strips come to rest at the bottom of the trough, a pusher 353 which rides on the bottom horizontal plate 351 pushes the dough strip through the transverse opening in the bottom of the trough, and since the pusher 353 works in timed relation with the drum carrying the forming units, the strip leaves the plate 351 to meet a pretzel forming die.

The pusher 353, similar to the pusher element 338, is actuated by a cam on the shaft 301. A plate 354 with a forked end saddles a pin 355 retained in the pusher 353. The lower end of the plate 354 is attached to a bar 356 which is attached to an arm 357. The lower end of the arm 357 is fixed to a forked joint 358 which grips the shaft 301. A roller 363 on the joint 358 rides on a cam 359 which actuates the pusher. While the pushers 353 and 338 are similarly actuated, they are opposite in action; therefore, the cams are adjusted to move the pushers 353 and 338 in opposite relation.

Referring now to Figure 4, each section of the forming unit picks up a dough strip as it passes the baffle 157 of the delivery elements 57, and as indicated in the position 293, the ends of the strip are twisted after having been bent inward. In the next step 294, the lower part is folded over the upper part, and in the position 295, the ends are impressed into the intermediate portion. At 296, the pretzel is ejected.

The elements of the forming unit are mounted between the side plates 233 and 234, and the side plates are mounted on a shaft 297 which is rotated by a chain 298 on sprockets 299 and 300. The sprocket 300 is mounted on a shaft 301, and this shaft is rotated by a chain 302 on sprockets 303 and 304. The rotation of the forming unit is, therefore, synchronized with the operation of the machine, and may be connected or disconnected therefrom by a clutch 305, as illustrated in the transmission layout shown in Figure 9.

The pretzel twisting machine of this invention, therefore, includes a dough hopper, dough feeding means associated with the hopper, a reciprocating knife for cutting the dough from the feeding means into dough strips, conveyors between which the dough strips are rolled and fed to forming units, dough strip receiving and feeding devices, and a drum having a plurality of forming units on the peripheral surface thereof with instrumentalities actuating the forming units in which the said actuating instrumentalities are operated by stationary cams spaced from the ends of the drum.

The rotation of the drum is synchronized with the operation of the conveyors, and as the forming units of the drum approach the feeder at the end of the conveyors, an arm from the drum engages and actuates the feeder wherein a dough strip is released. The released dough strip then drops by gravity upon the arcuate flanges of the pick-up plate with the ends of the strip dropping upon guide angles which keep the ends even and prevent twisting therein. As the pick-up plate continues to move, the ends of the dough strip drape over the side flanges, and the shoes on the bell cranks which have been spread apart by a roller extending from the end of the drum striking a cam, are now released and resiliently urged inward to indent the sides of the dough strip. In the next step, another roller strikes a cam which slides a rack outward, and the rack rotates a toothed star wheel on the twister which rotates the twister and twists the ends of the dough strip together. A roller on a gear segment then strikes a cam which actuates a gear to swing the twister yoke about its pivot, thereby folding the lower part of the dough strip over upon the upper part, and then another cam actuates an element to press two pins against the tips of the ends of the dough strip impressing the ends into the intermediate portion thereof. A cam then actuates the ejector pins to remove the pretzel which drops to a conveyor or the like, and the positions of the elements are returned by other cams so that by the time the unit has made a complete revolution, it is again ready to receive another dough strip.

While certain preferred embodiments of the invention are hereinbefore set forth, it is to be clearly understood that the invention is not to be limited to the exact construction illustrated and described because various modifications of the details may be provided in putting the invention into practice within the purview of the appended claims.

What is claimed is:

1. In a pretzel forming machine, a rotatable drum, a plurality of forming units in spaced relation on the peripheral surface of the drum, said forming units including a pick-up plate, a twister yoke, a twister pivotally mounted in the twister yoke, forming arms carried by the twister, yielding means maintaining said forming arms in a contracted position, and a cam spaced from the end of the drum for spreading the arms to permit the positioning of the extremities of a dough strip therebetween.

2. In a pretzel forming machine, the combination with a pretzel forming unit mounted on a rotatable drum having a horizontal axis in the machine and including a pick-up plate with arcuate dough strip receiving flanges, a twister yoke hingedly mounted with respect to said pick-up plate, and a twister pivotally mounted in the yoke, of a cam track fixedly mounted exteriorly of said drum, a cam adapted to move through said track to be actuated thereby, operative connections between said cam and said yoke whereby movement of said cam causes swinging movement of said yoke, a second cam track fixedly mounted exteriorly of said drum, a second cam adapted to move through said second track to be actuated thereby, and operative connections between said second cam and said twister whereby movement of cam causes twisting action of said twister.

3. In a pretzel twisting machine, the combination, which comprises, a drum, means rotatably mounting the drum, a plurality of forming units in spaced relation on the peripheral surface of the drum, means delivering dough strips to the forming units, means actuating the forming units to bend the ends of the dough strips inward, a twister on each of said forming units, a twister yoke in which the twister is pivotally mounted, means actuating the twister to twist the ends of the dough strip, means actuating the yoke to fold the dough strip, means locking the twister, means releasing the twister locking means, and means locking the twister yoke with the dough strip folded, means impressing the ends of the dough strip into the intermediate part thereof, and means ejecting the formed dough strip from the forming unit.

4. In a pretzel twisting machine, a supporting framework, a drum comprising vertically arranged spaced circular plates mounted on a horizontal axis and a plurality of forming units with each forming unit extending across said plates at the periphery of the drum; each of said forming units including a pick-up plate for receiving a dough strip in an inverted U-position, means for indenting the sides of the U, a cam carried by said framework at one side of said drum, a cooperating cam member adapted to engage said cam to be actuated thereby, operative connections between said cam member and said indenting means, a twister for twisting the indented sides, members carried by said framework at the other side of said drum forming a cam track, a second cam adapted to move through said track to be actuated thereby after operation of said indenting means, operative connections between said second cam and said twister, a twister yoke for folding the twisted portion back onto the portion held by the pick-up plate; other members carried by said framework at one side of said drum forming a second cam track, a third cam adapted to move through said second cam track to be actuated thereby after operation of said twister, operative connections between said third cam and said twister yoke, and means to rotate the drum.

5. In a pretzel twisting machine, a supporting framework, a drum comprising vertically arranged circular plates mounted on a horizontal axis and a plurality of forming units with each forming unit extending across said plates at the periphery of the drum; means to rotate the drum, each of said forming units including a pick-up plate adapted to receive a dough strip in an inverted U-position, a pair of complemental movable shoes adapted to engage the sides of the U to indent them inwardly, operating connections for said shoes, a twister for twisting indented sides, operating connections for said twister, cooperating cam members one of which is included as a part of said last mentioned operating connections and the other of which is carried by said framework at one side of said drum, means for folding the twisted portion onto the portion held by the pick-up plate; operating connections for said folding means, cooperating cam members one of which is included as a part of said last mentioned operating connections and the other of which is carried by said framework at said side of said drum a feeder carried by said framework for delivering a strip of dough to each forming unit, and cam means carried by said framework at the other side of the drum immediately adjacent to said feeder for engaging said operating connections to the shoes and rendering them effective.

6. In a pretzel twisting machine, a supporting framework, a drum comprising vertically arranged spaced circular plates mounted on a horizontal axis and a plurality of forming units with each forming unit extending across said plates at the periphery of the drum; means to rotate the drum, each of said forming units including a pick-up plate adapted to receive a dough strip in an inverted U-position, a pair of complemental movable shoes adapted to engage the sides of the U to indent them inwardly, spring means normally biasing said shoes to closed position, operating connections for said shoes including a roller, a twister for twisting the indented sides, and means for folding the twisted portion onto the portion held by the pick-up plate; a feeder carried by said framework for delivering a strip of dough to each forming unit, cam elements carried by said framework at the sides of said drum providing a cam track substantially at said feeder for receiving said roller to operate said shoes, and additional cam means carried by said framework at the sides of the drum and circularly arranged for causing subsequent sequential operation of said twister and folding means.

7. In a pretzel twisting machine, a supporting framework, a drum comprising vertically arranged spaced circular plates mounted on a horizontal axis and a plurality of forming units with each forming unit extending across said plates at the periphery of the drum; means to rotate the drum, each of said forming units including a pick-up plate for receiving a dough strip in an inverted U-position, means for indenting the sides of the U, a twister for twisting the indented sides, said twister including an operating spindle, a star wheel at one end of said spindle, a bar slidably mounted in the forming unit and having means thereon to engage the star wheel to cause rotation thereon, a roller at one end of said bar, and means for folding the twisted pretzel back on itself; a feeder carried by said framework for delivering a dough strip to said pick-up plate, cam means on said framework adjacent to said feeder for operating said side indenting means, other cam elements on said framework adjacent to said first-mentioned cam elements providing a cam track for receiving said roller to reciprocate said bar, and an additional cam on said framework for operating the folding means after operation of said twister.

8. In a pretzel twisting machine, a supporting framework, a drum comprising vertically arranged spaced circular plates mounted on a horizontal axis and a plurality of forming units with each forming unit extending across said plates at the periphery of the drum; means to rotate the drum, each of said forming units including a pick-up plate for receiving a dough strip in an inverted U-position, means for indenting the sides of the U, a twister for twisting the indented sides, a twister yoke in which said twister is pivotally mounted, a shaft hingedly mounting said twister yoke, a gear drivably carried by said shaft, a gear segment pivotally mounted on one of said circular plates and carrying a roller and a pinion meshing with said gear segment and said gear; a feeder carried by said framework for delivering a dough strip to said pick-up plate, cam elements on said framework adjacent to said feeder for operating said side indenting means, additional cam elements adjacent to said first-mentioned cam elements on said framework for operating said twister, and other cam elements on said framework providing a track adjacent to said last-mentioned cam elements for receiving said roller to operate said gear segment to swing said twister yoke.

9. In a pretzel twisting machine, a supporting framework, a drum comprising vertically arranged spaced circular plates mounted on a horizontal axis and a plurality of forming units with each forming unit extending across said plates at the periphery of the drum; means to rotate the drum, each of said forming units including a pick-up plate for receiving a dough strip in an inverted U-position, means for indenting the sides of the U, a twister for twisting the indented sides, a hingedly mounted twister yoke for folding a twisted pretzel back on itself with the free ends of the pretzel engaging the bend of the U, and paster pins slidably mounted in said pick-up plate for engaging the free ends of the pretzel and impressing them into the bend of the U, a feeder carried by said framework for delivering a dough strip to said pick-up plate, cam means carried by said framework adjacent to said feeder for operating said side indenting means, additional cam elements carried by said framework adjacent to said cam means for operating said twister, other cam elements carried by said framework for operating said twister yoke, and a cam on said framework for operating said paster, said several cams being arranged in a substantially semicircular path corresponding to the top half of said drum.

10. In a pretzel twisting machine, a supporting framework, a drum comprising vertically arranged spaced circular plates mounted on a horizontal axis and a plurality of forming units with each forming unit extending across said plates at the periphery of the drum; means to rotate the drum, each of said forming units including a pick-up plate for receiving a dough strip in an inverted U-position, means for indenting the sides of the U, cam means carried by said framework at one side of said drum for operating said indenting means immediately after a dough strip has been picked up by said pick-up plate, a twister for twisting the indented sides, cam means carried by said framework at the other side of said drum for operating said twister immediately after operation of said side indenting means, a hingedly mounted twister yoke for folding a twisted pretzel back on itself with the free ends of the pretzel engaging the bend of the U, cam means carried by said framework for operating said folding means immediately subsequent to operation of said twister, paster pins slidably carried by said pick-up plate for impressing the ends of the dough strip onto the bend of the U, cam means carried by said framework for operating said paster pins subsequent to operation of said folding means, pretzel ejecting mechanism operatively mounted in said pick-up plate, and cam means carried by said framework for operating said ejector mechanism.

HARRISON S. GIPE.

REFERENCES CITED

The following references are of record in the file of this patent:

UNITED STATES PATENTS

| Number | Name | Date |
| --- | --- | --- |
| 1,089,725 | Schaetzel | Mar. 10, 1914 |
| 1,142,533 | Schaetzel | June 8, 1915 |
| 1,397,233 | Robbins | Nov. 15, 1921 |
| 1,739,892 | Elliott | Dec. 17, 1929 |
| 1,957,135 | Fabian | May 1, 1934 |
| 2,026,526 | Gipe | Jan. 7, 1936 |
| 2,053,608 | Gerland | Sept. 8, 1936 |
| 2,090,291 | Gipe | Aug. 17, 1937 |